United States Patent Office 3,448,108
Patented June 3, 1969

3,448,108
SUBSTITUTED PHENETHYL HETEROCYCLES AND THEIR DERIVATIVES
Frank J. Villani, West Caldwell, N.J., assignor to Schering Corporation, Bloomfield, N.J., a corporation of New Jersey
No Drawing. Continuation-in-part of application Ser. No. 29,786, May 18, 1960. This application Apr. 16, 1965, Ser. No. 448,860
Int. Cl. C07d *49/00, 51/00, 91/30*
U.S. Cl. 260—250                                  19 Claims This application is a continuation-in-part of my copending application, Ser. No. 29,786, filed on May 18, 1960, now issued as U.S. Patent 3,188,315.

This invention relates to novel organic compounds which possess valuable physiological activity. More specifically, it relates to novel compounds capable of decreasing the serum cholesterol in the blood and to processes for their preparation.

While the exact relationship of the serum cholesterol and the incidence of atherosclerosis is still not precisely understood, there is a marked correlation between the content of serum cholesterol in the blood and the incidence of atherosclerosis. The desirability of lowering the content of serum cholesterol in the blood to effect a prevention or reversal of atherosclerosis is thus apparent.

Of the known compounds in use today for prevention or reversal of atherosclerosis, compounds of an estrogenic nature, and in particular β-estradiol, have been found to be of the more successful agent. Unfortunately, the dosage of estrogens required to effect significant lowering of the serum cholesterol is such that undesired hormonal side effects inevitably accompany their use.

I have discovered a new class of compounds that possesses the valuable property of lowering the serum cholesterol content in the blood with minimal, if any, side effects. Hence, these compounds may serve as valuable therapeutic agents in the treatment of atherosclerosis and related circulatory diseases, and may also serve as valuable and circulatory disease preventatives.

In general, the compounds of my invention may be represented by the following structural formula and include the nontoxic acid addition salts thereof:

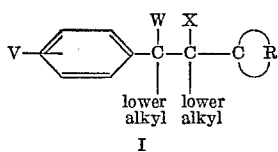

wherein $\widehat{CR}$ is a nitrogen-containing heterocycle having at least 5 but less than 7 cyclic atoms, at least 1 but less than 3 of any of said cyclic atoms being other than carbon; and W and X are members of the group consisting of hydrogen and hydroxy with the proviso that at least one of W and X is hydrogen, and when W and X are taken together, they form an additional double bond, and V is a member of the group consisting of hydrogen, hydroxy, lower alkoxy, lower alkyl and halogen.

As an alternative to Formula I and for further elucidation, the following structural formulae may more specifically depict the compounds of my invention:

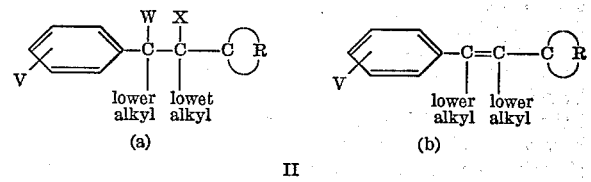

II wherein V, and $\widehat{CR}$ are as defined in Formula I and W and X are members of the group consisting of hydrogen and hydroxy with the proviso that at least one of W and X is hydrogen.

Representatives of the groups embraced by the above designations of Formulae I and II are as follows: In addition to hydrogen and hydroxy, V may be halogen, such as bromo, fluoro, iodo, or preferably chloro; lower alkyl, preferably methyl, and others such as ethyl, straight and branched chain propyl, butyl, amyl; lower alkoxy such as methoxy, ethoxy, propoxy, butoxy, and amyloxy. With respect to the aromatic ring, the orientation of the members of the group V may be ortho-, meta-, or para. The nitrogen-containing $\widehat{CR}$ group is representative of a cyclic ring of from 5 to 6 members which, in addition to having carbon and nitrogen, may also have sulfur. The specific ring structures are piperidyl, piperazyl, pyrazyl, thiazyl and imidazyl and include such groups as 4-imidazyl, 2-thiazyl, the 2,- 3-, and 4-piperidyls, and 2-piperazyl.

Also included within the scope of my invention are the pharmaceutically acceptable therapeutic salts of the foregoing, such as the hydrochloride.

The compounds of my invention may be prepared by several analogously known methods which basically constitute a coupling reaction wherein the aromatic and the heterocyclic ring structures are joined together through a 2-carbon aliphatic bridge. To illustrate the origin and formation of the 2-carbon aliphatic bridge, as well as to more particularly demonstrate the various modes of coupling the terminal ring structures, the following general methods are set forth:

(a) An alkylbenzene possessing a carbonyl function beta to the benzene ring may be treated with an alkali metal salt of a nitrogen-containing heterocycle so as to effect nucleophilic addition of the heterocycle anion in the substituted alkylbenzene. This substituted alkylbenzene may be either a ketonic carbonyl function, or it may be an alkali metal salt of a carboxylic acid. For example, a lithium salt prepared from 2-bromopyrazine may be reacted with 4-(p-methoxyphenyl)-3-hexanone to give 3-(2-pyrazyl)-4-(p-methoxyphenyl)-3-hexanol. Alternatively, this product may be obtained by reacting the lithium salt of 2-(p-methoxyphenyl)-butyric acid with 2-pyrazyl lithium to give the 1-(2-pyrazyl)-2-(p-methoxyphenyl)-1-butanone which when reacted with ethylmagnesium bromide will yield 3-(2-pyrazyl)-4-(p-methoxyphenyl)-3-hexanol.

(b) Similarly, an alkylbenzene possessing a carbonyl function on the carbon atom alpha to the phenyl group may be treated with a disubstituted alkane having as its substituents, on the same carbon atom, an alkali metal and a nitrogen-containing heterocycle so as to yield a compound having its carbinol function on the carbon atom of the bridge that is alpha to the phenyl radical. Also, as in (a) above, alpha-carbon carbinols may be prepared by treating the appropriate alkanones with the appropriate Grignard reagent.

The carbinols, prepared as described in (a) and (b) above, are readily dehydrated by analogously known methods using conventional dehydrating agents, for example, treatment with a strong acid. Generally, I have found that where the hydroxyl group is beta to the phenyl group, superior results are obtained by treatment with potassium pyrosulfate at elevated temperatures in the range of 250° C., and that where the hydroxyl group is alpha to the phenyl group, superior results are obtained by refluxing in a mixture of hydrochloric and acetic acids. Other suitable dehydrating agents may similarly be used however, such as for example, potassium bisulfite, iodine, phosphorous pentoxide or phosphorous trioxide. In general, when the fusion-type dehydration is employed, the reaction is carried out within the temperature range of about 200°–280° C.

The products obtained upon dehydration in the above cases are substantially identical and may be catalytically hydrogenated by analogously known methods. The hydrogenations are generally carried out in anhydrous alcoholic solvents in the presence of the usual catalysts, e.g. Raney nickel etc. The reaction may be conducted at very slightly increased atmospheric pressure to very highly increased pressure, although it is preferable to use elevated pressures in the range of about 40 to 150 lbs./sq. in.

(c) Another method to form the 2-carbon aliphatic bridge type compounds is via a modified Wurtz-type reaction wherein an α-halogenated alkylbenzene is reacted with an alkane substituted by a heterocycle and an alkali metal, both of which are located on the same carbon atom of the alkane radical.

Formation of the lower alkyl groups attached to the carbon atoms separating the phenyl and $\overset{\frown}{C\ R}$ groups as defined above, may be accomplished during the formation of the basic type structure or they may be joined to the aliphatic bridge after the basic structure is formed.

The following examples will serve to further exemplify the nature of these various reactions, and to further demonstrate the scope of the various groups which may be present in a particular position. These examples however, are not intended and should not be construed in any way so as to limit the scope of the present invention.

EXAMPLE 1

3-(2-pyridyl)-4-(p-methoxyphenyl)-3-hexanol

An ethereal solution of 27.5 g. of n-butyl bromide is added in a dropwise fashion at −10° C. with stirring to 3 g. lithium shot and 150 ml. of anhydrous ether. When the lithium metal has been allowed to react completely, the mixture is cooled to −40° C. and a solution of 31.5 g. of 2-bromopyridine in an equal volume of anhydrous ether is added dropwise with stirring. After stirring for 15–20 minutes, an ethereal solution of 27 g. of 4-(p-methoxyphenyl)-3-hexanone is added and the mixture stirred for one hour at −40° C. The mixture is then stirred for an additional five hours and permitted to warm to room temperature.

Water is next added to the mixture. The organic layer is then separated and extracted with dilute (10%) hydrochloric acid. These acid extracts are rendered alkaline with ammonium hydroxide solution and extracted with chloroform. After removal of the chloroform from these organic extracts, the residue is triturated with hexane. Upon collection by filtration of the tan solid thus formed, there is obtained material consisting substantially of one isomeric form (designated as "Isomer A") of 3-(2-pyridyl)-4-(p-methoxyphenyl)-3-hexanol, M.P. 80–84° C., which upon purification by recrystallization from hexane demonstrates a melting point of 90–92° C.

The filtrate obtained upon filtration of the above tan solid is evaporated to an oil which when distilled in vacuo yields the other isomeric form (designated as "Isomer B") of 3-(2-pyridyl)-4-(p-methoxyphenyl)-3-hexanol, B.P. 164–168° C./1 mm., $n_D^{28}$ 1.5548–1.5555.

In a similar fashion, by employing an equivalent amount of 3-bromopyridine in place of 2-bromopyridine there is prepared the corresponding isomers A and B of 3-(3-pyridyl)-4-(p-methoxyphenyl)-3-hexanol, M.P. (A) 96–100° C., B.P.; (B) 200–210° C./3 mm.

Similarly, the following substituted ketones are substituted for 4-(p-methoxyphenyl)-3-hexanone: 2-anisyl-3-pentanone; 3-anisyl-2-butanone; 4-(m-methoxyphenyl)-3-hexanone; 4-(o-methoxyphenyl)-3-hexanone; 2 - (p - isopropylphenyl)-3-pentanone; 4-phenyl-3-hexanone; 4-(p-chlorophenyl) - 3 - hexanone; and α - ethyldesoxyanisoin. There are thus prepared in respective order the following compounds (where two values are given for the same constant the second value refers to the other isomeric form): 2-(p-methoxyphenyl)-3-(2-pyridyl)-3-pentanol, B.P. 165–175°/3 mm., M.P. 75–76° C.; 2-(p-methoxyphenyl)-3-(2-pyridyl)-3-butanol, B.P. 180–183°/2.5 mm., M.P. 69–72, 97–99° C.; 3-(m-methoxyphenyl)-4-(2-pyridyl)-4-hexanol, B.P. 160–170°/1 mm., $n_D^{25}$ 1.5554; 3-(o-methoxyphenyl)-4-(2-pyridyl)-4-hexanol, B.P. 150–156° C./1 mm., M.P. 92–94° C.; 3-(p-methylphenyl)-4-(2-pyridyl)-4-hexanol, B.P. 167–173° C./3 mm.; 2-(p-isopropylphenyl)-3-(2-pyridyl)-3-pentanol, B.P. 170–176° C./2 mm.; 3-phenyl-4-(2-pyridyl)-4-hexanol, M.P. 92–96° C.; 3-(p-chlorophenyl)-4-(2-pyridyl)-4-hexanol, B.P. 180–187° C./3 mm.; and 1,2-di-(p-anisyl)-1-(2-pyridyl)-1-butanol, M.P. 123–126° C.

EXAMPLE 2

3-(2-pyrazyl)-4-(p-methoxyphenyl)-3-hexanol

An ethereal solution of 27.5 g. of n-butyl bromide is added in a dropwise fashion at −10° C. with stirring to 3 g. lithium shot and 150 ml. of anhydrous ether. When the lithium metal has been allowed to react completely, the mixture is cooled to −40° C. and a solution of 31.8 g. of 2-bromopyrazine in an equal volume of anhydrous ether is added dropwise with stirring. After stirring for 15–20 minutes, an ethereal solution of 27 g. of 4-(p-methoxyphenyl)-3-hexanone is added and the mixture stirred for one hour at −40° C. The mixture is then stirred for an additional five hours and permitted to warm to room temperature.

Water is next added to the mixture. The organic layer is then separated and extracted with dilute (10%) hydrochloric acid. These acid extracts are rendered alkaline with ammonium hydroxide solution and extracted with chloroform. After removal of the chloroform from these organic extracts, the residue is triturated with hexane. The product of this example (as well as the hereinafter mentioned compounds) is thus produced in both of its isomeric forms which are separated through the usual techniques such as fractional crystallization such as demonstrated for the separation of the isomers produced in Example 1.

Similarly the following substituted ketones are substituted for 4-(p-methoxyphenyl)-3-hexanone:

2-anisyl-3-pentanone;
3-anisyl-2-butanone;
4-(m-methoxyphenyl)-3-hexanone;
4-(o-methoxyphenyl)-3-hexanone;
2-(p-isopropylphenyl)-3-pentanone;
4-phenyl-3-hexanone;
4-(p-chlorophenyl)-3-hexanone; and
α-ethyldesoxyanisoin.

There are thus prepared in respective order the following compounds:

2-(p-methoxyphenyl)-3-(2-pyrazyl)-3-pentanol, 2-(p-methoxyphenyl)-3-(2-pyrazyl)-3-butanol,
3-(m-methoxyphenyl)-4-(2-pyrazyl)-4-hexanol,
3-(o-methoxyphenyl)-4-(2-pyrazyl)-4-hexanol,
3-(p-methylphenyl)-4-(2-pyrazyl)-4-hexanol,
2-(p-isopropylphenyl)-3-(2-pyrazyl)-3-pentanol,
3-phenyl-4-(2-pyrazyl)-4-hexanol,
3-(p-chlorophenyl)-4-(2-pyrazyl)-4-hexanol, and
1,2-di-(p-anisyl)-1-(2-pyrazyl)-1-butanol.

Similarly, by replacing the 2-bromopyrazine reactant of this example with equivalent quantities (0.2 mole) of either 2-bromothiazole or 2-bromoimidazole and by following substantially the procedures outlined above, there are produced:

3-(2-thiazyl)-4-(p-methoxyphenyl)-3-hexanol,
2-(p-methoxyphenyl)-3-(2-thiazyl)-3-pentanol,
2-(p-methoxyphenyl)-3-(2-thiazyl)-3-butanol,
3-(m-methoxyphenyl)-4-(2-thiazyl)-4-hexanol,
3-(o-methoxyphenyl)-4-(2-thiazyl)-4-hexanol,
3-(p-methylphenyl)-4-(2-thiazyl)-4-hexanol,
2-(p-isopropylphenyl)-3-(2-thiazyl)-3-pentanol,
3-(phenyl)-4-(2-thiazyl)-4-hexanol,
1,2-di-(p-anisyl)-1-(2-thiazyl)-1-butanol,
3-(2-imidazyl)-4-(p-methoxyphenyl)-3-hexanol,
2-(p-methoxyphenyl)-3-(2-imidazyl)-3-pentanol,
2-(p-methoxyphenyl)-3-(2-imidazyl)-3-butanol,
3-(m-methoxyphenyl)-4-(2-imidazyl)-4-hexanol,
3-(o-methoxyphenyl)-4-(2-imidazyl)-4-hexanol,
3-(p-methylphenyl)-4-(2-imidazyl)-4-hexanol,
2-(p-isopropylphenyl)-3-(2-imidazyl)-3-pentanol,
3-(phenyl)-4-(2-imidazyl)-4-hexanol,
1,2-di-(p-anisyl)-1-(2-imidazyl)-1-butanol.

EXAMPLE 3

3-(2-pyrazyl)-4-(p-methoxyphenyl)-3-hexene

Twenty grams of recrystallized 3-(2-pyrazyl)-4-(p-methoxyphenyl)-3-hexanol are mixed with 80 g. of powdered potassium pyrosulfate and the mixture heated to a temperature of 240–260° C. Upon liquification of the mixture, the heating is continued for an additional 10 minutes. The hot homogeneous mixture is then poured onto ice and the resulting mixture neutralized with ammonium hydroxide. The product is next extracted with chloroform and the chloroform extracts then concentrated to a residue. Distillation of this residue yields the material of this example, 3-(2-pyrazyl)-4-(p-methoxyphenyl)-3-hexene.

In an analogous fashion, the following compounds are treated in the manner of this example:
2-(p-methoxyphenyl)-3-(2-pyrazyl)-3-pentanol;
2-(p-methoxyphenyl)-3-(2-pyrazyl)-3-butanol;
3-(m-methoxyphenyl)-4-(2-pyrazyl)-4-hexanol;
3-(o-methoxyphenyl)-4-(2-pyrazyl)-4-hexanol;
3-(p-methylphenyl)-4-(2-pyrazyl)-4-hexanol;
2-(p-isopropylphenyl)-3-(2-pyrazyl)-3-pentanol;
3-phenyl-4-(2-pyrazyl)-4-hexanol;
3-(p-chlorophenyl)-4-(2-pyrazyl)-4-hexanol; and
1,2-di-(p-anisyl)-1-(2-pyrazyl)-1-butanol.

There are thus formed the following compounds:

2-(p-methoxyphenyl)-3-(2-pyrazyl)-2-pentene;
2-(p-methoxyphenyl)-3-(2-pyrazyl)-2-butene;
3-(m-methoxyphenyl)-4-(2-pyrazyl)-3-hexene;
3-(o-methoxyphenyl)-4-(2-pyrazyl)-3-hexene;
3-(p-methylphenyl)-4-(2-pyrazyl)-3-hexene;
2-(p-isopropylphenyl)-3-(2-pyrazyl)-2-pentene;
3-phenyl-4-(2-pyrazyl)-3-hexene;
3-(p-chlorophenyl)-4-(2-pyrazyl)-3-hexene; and
1,2-di-(p-anisyl)-1-(2-pyrazyl)-1-butene.

These imidazyl and thiazyl heterocycle-containing compounds listed at the end of Example 2 may be similarly treated to produce:
3-(2-thiazyl)-4-(p-methoxyphenyl-3-hexene,
2-(p-methoxyphenyl)-3-(2-thiazyl)-2-pentene,
2-(p-methoxyphenyl)-3-(2-thiazyl)-2-butene,
2-(m-methoxyphenyl)-4-(2-thiazyl)-3-hexene,
3-(o-methoxyphenyl)-4-(2-thiazyl)-3-hexene
3-(p-methylphenyl)-4-(2-thiazyl)-3-hexene,
2-(p-isopropylphenyl)-3-(2-thiazyl)-2-pentene,
3-(phenyl)-4-(2-thiazyl)-3-hexene,
1,2-di-(p-anisyl)-1-(2-thiazyl)-1-butene,
3-(2-imidazyl)-4-(p-methoxyphenyl)-3-hexene,
2-(p-methoxyphenyl)-3-(2-imidazyl)-2-pentene,
2-(p-methoxyphenyl)-3-(2-imidazyl)-2-butene,
3-(m-methoxyphenyl)-4-(2-imidazyl)-3-hexene,
3-(o-methoxyphenyl)-4-(2-imidazyl)-3-hexene,
3-(p-methylphenyl)-4-(2-imidazyl)-3-hexene,
2-(p-isopropylphenyl)-3-(2-imidazyl)-2-pentene,
3-(phenyl)-4-(2-imidazyl)-3-hexene,
1,3-di-(p-anisyl)-1-(2-imidazyl)-1-butene.

EXAMPLE 4

3-(2-pyrazyl)-4-(p-methoxyphenyl)-hexane

Thirteen grams of 3-(2-pyrazyl)-4-(p-methoxyphenyl)-3-hexene are dissolved in 150 ml. of anhydrous alcohol. This solution is then placed in a Parr hydrogenation apparatus and hydrogenation in the presence of Raney nickel at an initial pressure of 60 lbs./sq. in. The hydrogenation is continued for approximately two hours at room temperature after which time the catalyst is removed by filtration and solvent is then removed by distillation. Distillation in vacuo of the residue yields 3-(2-pyrazyl)-4-(p-methoxyphenyl)-hexane.

In a similar fashion the following compounds are subjected to the above hydrogenation procedure:
2-(p-methoxyphenyl)-3-(2-pyrazyl)-2-pentene;
2-(p-methoxyphenyl)-3-(2-pyrazyl)-2-butene;
3-(m-methoxyphenyl)-4-(2-pyrazyl)-2-hexene;
3-(o-methoxyphenyl)-4-(2-pyrazyl)-3-hexene;
3-(p-methylphenyl)-4-(2-pyrazyl)-3-hexene;
2-(p-isopropylphenyl)-3-(2-pyrazyl)-2-pentene;
3-phenyl-4-(2-pyrazyl)-3-hexene;
1,2-di-(p-anisyl)-1-(2-pyrazyl)-1-butene.

There are thus prepared the following compounds:

2-(p-methoxyphenyl)-3-(2-pyrazyl)-pentane;
2-(p-methoxyphenyl)-3-(2-pyrazyl)-butane;
3-(m-methoxyphenyl)-4-(2-pyrazyl)-hexane;
3-(o-methoxyphenyl)-4-(2-pyrazyl)-hexane;
3-(p-methylphenyl)-4-(2-pyrazyl)-hexane;
2-(p-isopropylphenyl)-3-(2-pyrazyl)-pentane;
3-phenyl-4-(2-pyrazyl)-hexane; and
1,2-di-(p-anisyl)-1-(2-pyrazyl)-butane.

Alternatively 3 - (2 - pyrazyl)-4-(p-methoxyphenyl)-hexane is prepared in the following manner.

The requisite starting material, anethole hydrobromide is prepared from 14.8 gm. anethole according to the method of Kharasch et al., J.A.C.S., 65, 493 (1943). This compound is maintained at −80° C. while the following reaction medium is prepared. To 1 l. of liquid ammonia are added 2.39 grams of sodium metal and a trace of ferric nitrate. There are next added 12 g. of 2-n-propylpyrazine and the mixture stirred for ½ hour. The anethole hydrobromide is then added in a dropwise fashion with stirring of the reaction mixture. The stirring is continued for 4 hours and the ammonia is then allowed to evaporate while displacing with anhydrous ether. The resulting ether solution is allowed to stir overnight. There is then added a large volume of 10% hydrochloric acid solution. The organic layer is separated and discarded and the aqueous layer then rendered neutral by addition of ammonium hydroxide and extracted with chloroform. The chloroform extracts are then reduced to residue in vacuo and the residue distilled in vacuo to yield 3-(2-pyrazyl)-4-(p-methoxyphenyl)-hexane.

EXAMPLE 5

3-(2-pyrazyl)-4-(p-hydroxyphenyl)-hexane

Fifteen grams of 3-(2-pyrazyl)-4-(p-methoxyphenyl)-hexane are refluxed with 60 ml. of 48% hydrobromic acid for seven hours. The mixture is then concentrated in vacuo and the residue is dissolved in water and rendered alkaline by the addition of ammonium hydroxide solution. The basic solution is extracted with chloroform and the organic extracts concentrated to a residue. The residue is triturated with hexane and allowed to stand in a refrigerator for ten to fifteen hours. The solid material is recrystallized from a benzene hexane mixture to yield 3-(2-pyrazyl)-4-(p-hydroxyphenyl)-hexane.

The following compounds are treated by the identical procedure:

2-(p-methoxyphenyl)-3-(2-pyrazyl)-pentane;
2-(p-methoxyphenyl)-3-(2-pyrazyl)-butane;
3-(m-methoxyphenyl)-4-(2-pyrazyl)-hexane;
3-(o-methoxyphenyl)-4-(2-pyrazyl)-hexane;
3-(m-methoxyphenyl)-4-(2-pyrazyl)-3-hexene and
2-(p-methoxyphenyl)-3-(2-pyrazyl)-3-butene.

There are thus prepared the following compounds:

2-(p-hydroxyphenyl)-3-(2-pyrazyl)-pentane;
2-(p-hydroxyphenyl)-3-(2-pyrazyl)-butane;
3-(m-hydroxyphenyl)-4-(2-pyrazyl)-hexane;
3-(o-hydroxyphenyl)-4-(2-pyrazyl)-hexane;
3-(m-hydroxyphenyl)-4-(2-pyrazyl)-3-hexene; and
2-(p-hydroxyphenyl)-3-(2-pyrazyl)-3-butene.

EXAMPLE 6

3-(2-piperidyl)-4-(p-methoxyphenyl)-3-hexanol

Nine grams of 3-(2-pyridyl)-4-(p-methoxyphenyl)-3-hexanol (prepared in Example 1) are dissolved in 150 ml. of ethanol and 4 ml. of concentrated hydrochloric acid. The solution is then placed in a Parr hydrogenation apparatus and hydrogenated in the presence of 1 g. of platinum oxide for four hours at 60 lbs./sq. in. of hydrogen. The catalyst is then removed by filtration, and the solvent is next removed by evaporation. The residue is then dissolved in water which is subsequently rendered basic with ammonium hydroxide and extracted with chloroform. The chloroform is removed by distillation and the residue distilled in vacuo to yield -3-(2-piperidyl)-4-(p-methoxyphenyl)-3-hexanol, B.P. 183–186° C./3 mm., $n_D^{25}$ 1.5335.

This compound may be treated in the manner of Example 3 to yield the correspondingly substituted hexane.

Similarly 3-(2-pyridyl)-4-)p-methoxyphenyl)-hexane is hydrogenated by the above procedure to yield 3-(2-piperidyl)-4-(p-methoxyphenyl)-hexane, B.P. 152–154° C./1 mm. $n_D^{25}$ 1.5236–5240.

EXAMPLE 7

3-(p-methoxyphenyl)-4-(2-pyrazyl)-3-hexanol

A suspension of sodamide in liquid ammonia is prepared from 7 g. of sodium in a manner analogous to that of the alternate procedure of Example 4. To this suspension is added 36.6 g. of 2-n-propylpyrazine and the mixture allowed to stir for ½ hour. At the end of this time, a solution consisting of 24.6 g. of p-methoxypropiophenone in 50 ml. of anhydrous ether is then added dropwise. After stirring for an additional two hours, 25 g. of ammonium chloride are added in several small portions. Three hundred milliliters of anhydrous ether are next added and the mixture allowed to stir at room temperature until the liquid ammonia has evaporated. To the resultant mixture is then added a quantity of water and the mixture is extracted with ether. The combined ether extracts are then in turn extracted with hydrochloric acid. After washing the acidic extracts once with ether, they are rendered alkaline by the addition of ammonium hydroxide. The basic mixture is next extracted with chloroform and upon concentration of these organic extracts to a residue and distillation in vacuo of the residue, there is obtained the compound of the example 3-(p-methoxyphenyl)-4-(2-pyrazyl)-3-hexanol.

In a similar manner by employing the appropriate and corresponding substituted phenyl ketones and the appropriate and corresponding pyrazines, the following compounds are prepared according to this procedure: 2-(p-methoxyphenyl)-3-(2-pyrazyl)-2-pentanol; 2-(p-methoxyphenyl)-3-(2-pyrazyl); 2-pentanol; 3-(p-chlorophenyl)-4-(2-pyrazyl)-3-hexanol; 3-(p-bromophenyl)-4-(2-pyrazyl)-3-hexanol; 2 - (3,4 - dimethoxyphenyl)-3-(2-pyrazyl)-2-pentanol.

Alternatively the compound of this example, 3-(p-methoxyphenyl)-4-(2-pyrazyl)-3-hexanol, may be prepared by the action of phenyl lithium (prepared at reflux temperature from 47 g. of bromobenzene and 4.2 g. of lithium metal in 500 ml. of anhydrous ether) on 2-n-propylpyrazine (36.6 g.) and p-methoxy-propiophenone (25 g.) The reaction is executed for approximately four hours and the product isolated according to the method of isolation described above.

According to this alternate procedure the following compounds are prepared from the appropriate and corresponding starting materials: 3-(p-methylphenyl)-4-(2-pyrazyl)-3-hexanol, and 3-(m-methoxyphenyl)-4-(2-pyrazyl)-3-hexanol.

As an additional alternative, butyl lithium may be substituted for phenyl lithium.

EXAMPLE 8

3-(2-pyrazy)-4-(p-methoxyphenyl)-3-hexene

Fourteen grams of 3-(p-methoxyphenyl)-4-(2-pyrazyl-3-hexanol are heated with 27 ml. of concentrated hydrochloric acid and 92 ml. of glacial acetate acid for four hours. At the end of this time the reaction mixture is concentrated under reduced pressure and rendered basic by the addition of ammonium hydroxide. The basic solution is then extracted with chloroform, the chloroform extracts concentrated to a residue, and the residue distilled in vacuo to yield 3-(2-pyrazyl)-4-(p-methoxyphenyl)-3-hexene.

EXAMPLE 9

3-(p-methoxyphenyl)-4-(piperazyl)-hexane

Ten grams of the compound 3-(p-methoxyphenyl)-4-(pyrazyl)-hexane in 150 ml. of absolute ethanol are hydrogenated in an autoclave employing platinum oxide as the catalyst and maintaining a temperature of 150° C. and a pressure of 1,000 lbs./sq. in. of hydrogen. There is thus obtained the compound of this example, 3-(p-methoxyphenyl)-4-(piperazyl)-hexane.

By employing 2-(p-methoxyphenyl)-3-(2-pyrazyl)-pentane, 2 - (p - methoxyphenyl) - 3 - (2 - pyrazyl) - butane, 3 - (m - methoxyphenyl) - 4 - (2 - pyrazyl) - hexane, 3 - (o - methoxyphenyl) - 4 - (2 - pyrazyl) - hexane; 3 - (p - methylphenyl) - 4 - (2 - pyrazyl) - hexane; 2 - (p - isopropylphenyl) - 3 - (2 - pyrazyl) - pentane; 3 - phenyl - 4 - (2 - pyrazyl) - hexane; and 1,2 - di - (p - anisyl) - 1 - (2 - pyrazyl) - butane in place of the 3-(p-methoxyphenyl)-4-(pyrazyl)-hexane, and by following substantially the same procedure outlined in this example, there is produced:

2-(p-methoxyphenyl)-3-(2-piperazyl)-pentane,
2-(p-methoxyphenyl)-3-(2-piperazyl)-butane,
3-(m-methoxyphenyl)-4-(2-piperazyl)-hexane,
3-(o-methoxyphenyl)-4-(2-piperazyl)-hexane,
3-(p-methylphenyl)-4-(2-piperazyl)-hexane,
2-(p-isopropylphenyl)-3-(2-piperazyl)-pentane,
3-phenyl-4-(2-piperazyl)-hexane, and
1,2-di-(p-anisyl)-1-(2-piperazyl)-butane.

Similarly, by employing 3-(3-pyridyl)-4-(p-methoxyphenyl)-hexane,
2-(p-methoxyphenyl)-3-(2-pyridyl)-pentane,
2-(p-methoxyphenyl)-3-(2-pyridyl)-butane,
3-(m-methoxyphenyl)-4-(2-pyridyl)-hexane,
3-(o-methoxyphenyl)-4-(2-pyridyl)-hexane,
3-(p-methylphenyl)-4-(2-pyridyl)-hexane, 2-(p-isopropylphenyl)-3-(2-pyridyl)-pentane,
3-phenyl-4-(2-pyridyl)-hexane, and
1,2-di-(p-anisyl)-1-(2-pyridyl)-butane in place of the 3-(p-methoxyphenyl)-4-(pyrazyl)-hexane of this example, there is produced 3-(3-piperidyl)-4-(p-methoxyphenyl)-hexane,
2-(p-methoxyphenyl)-3-(2-piperidyl)-pentane,
2-(p-methoxyphenyl)-3-(2-piperidyl)-butane,
3-(m-methoxyphenyl)-4-(2-piperidyl)-hexane,
3-(o-methoxyphenyl)-4-(2-piperidyl)-hexane,
3-(p-methylphenyl)-4-(2-piperidyl)-hexane,
2-(p-isopropylphenyl)-3-(2-piperidyl)-pentane,
3-phenyl-4-(2-piperidyl)-hexane, and
1,2-di-(p-anisyl)-1-(2-piperidyl)-butane.

EXAMPLE 10

2-(m-methoxyphenyl)-3-(2-pyrazyl)-2-pentanol

The sodium salt of 2-propylpyrazine is prepared and reacted with m-methoxyacetophenone according to the procedure of Example 7 and there is thus obtained the compound of this example, 2-(m-methoxyphenyl)-3-(2-pyrazyl)-2-pentanol, B.P. 203–208° C./1.5 mm.

EXAMPLE 11

3-(2-triazyl)-4-(p-methoxyphenyl)-3-hexanol

To a solution of butyl lithium prepared from 2.5 g. of lithium metal and 25 g. of n-butyl bromide in 500 ml. of anhydrous ether at −30° C. is added dropwise an ethereal solution of 30 g. of 2-bromothiazole. After ½ hour there is added a solution of 2.5 g. of 4-anisyl-3-hexanone in 100 ml. of ether. The mixture is stirred for four hours. At the end of this time, water is cautiously added and the organic layer separated. The organic layer is then extracted with dilute hydrochloric acid and the acidic extracts washed once with ether and then rendered alkaline by the addition of ammonium hydroxide. The product is isolated by extraction with chloroform, concentration of these extracts to a residue, and recrystallization of the residue from hexane, M.P. 99–100° C.

The compounds of my invention may be used in the form of pharmaceutical preparations which contain the new compound in admixture with a pharmaceutical carrier suitable for enteral or parenteral administration. Such preparations may be in solid forms, as for example tablets and capsules, or in liquid forms, as for example elixirs, emulsions, and injectables.

In the formulation of pharmaceutical preparations there can be employed such substances which do not react with the compounds, as for example water, gelatin, lactose, starches, magnesium stearate, talc, vegetable oils, benzyl alcohols, gums, polyalkylene glycols, and petroleum jelly.

The following examples will serve to further exemplify the nature of these various formulations. These examples, however, are not intended and should not be construed in any way so as to limit the scope of product formulation.

EXAMPLE 12

Tablet composition

| Ingredients: | Quantity for 1000 capsules, grams |
|---|---|
| (1) 3-anisyl-4-(2-pyrazyl)-hexane | 250.50 |
| (2) Starch, U.S.P. | 17.50 |
| (3) Magnesium stearate, U.S.P. | 2.50 |
| To make | 270.00 |

Prepare a hot starch paste, using ¼ of the amount of starch in a minimum amount of hot water, and add the hot paste to 1 to obtain a damp granulation. Pass the damp granulation through a No. 12 screen. Dry the screened granulation at 40°–45° C. overnight, and pass the dried granules through a No. 16 screen. To the dried granules add the remainder of 2 and 3 and mix to insure even granule distribution. Compress 270 mg. per tablet on a ⅜ inch, standard concave, scored punches at 3–5 kg. hardness.

EXAMPLE 13

Parenteral composition (100 mg./cc.)

| Ingredients: | Quantity for 100 ml. |
|---|---|
| (1) 3-anisyl-4-(2-pyrazyl)-hexane, micronized | g__ 10.0 |
| (2) Carboxymethyl cellulose, medium viscosity | g__ 0.5 |
| (3) Sodium chloride, U.S.P. | g__ 0.9 |
| (4) Benzyl alcohol, U.S.P. | g__ 0.9 |
| (5) Water for injection, U.S.P. q.s., about | ml__ 100.0 |

In approximately 80% of 5, dissolve 4, 3, and 2. Incorporate 1 into this solution and pass through a rotar-stator (fine setting). Add enough of 5 to bring to 100 cc. volume. Filter through a sintered glass filter of fine porosity. Fill the filtered solution into vials, cap, and autoclave.

From the foregoing exemplifications it is obvious to one of ordinary skill in the art that further variations may also be effected to produce specifically desired end products. It is therefore contemplated that by the reasonable use of the foregoing teachings, specifically desired products and pharmaceutically acceptable formulations thereof may be so-prepared.

I claim:

1. A compound of the formula:

$$V-\langle\phantom{x}\rangle-\underset{\substack{\text{lower}\\ \text{alkyl}}}{\overset{W}{\underset{|}{C}}}-\underset{\substack{\text{lower}\\ \text{alkyl}}}{\overset{X}{\underset{|}{C}}}-C\widehat{R}$$

wherein $\widehat{CR}$ is a member of the group consisting of piperidyl, piperazyl, pyrazyl, thiazyl and imidazyl, V is a member of the group consisting of hydrogen, hydroxy, lower alkoxy, lower alkyl and halogen, W and X are members of the group consisting of hydrogen and hydroxy with the proviso that at least one of W and X is hydrogen, and when W and X are taken together they form an additional double bond between the carbon atoms to which they are attached.

2. A compound of the formula:

$$V-\langle\phantom{x}\rangle-\underset{\substack{\text{lower}\\ \text{alkyl}}}{\overset{W}{\underset{|}{C}}}-\underset{\substack{\text{lower}\\ \text{alkyl}}}{\overset{X}{\underset{|}{C}}}-\text{Piperidyl}$$

wherein V is a member of the group consisting of hydrogen, hydroxy, lower alkoxy, lower alkyl and halogen, W and X are members of the group consisting of hydrogen and hydroxy with the proviso that at least one of W and X is hydrogen, and when W and X are taken together they form an additional double bond between the carbon atoms to which they are attached.

3. A compound of the formula:

$$V-\langle\phantom{x}\rangle-\underset{\substack{\text{lower}\\ \text{alkyl}}}{\overset{W}{\underset{|}{C}}}-\underset{\substack{\text{lower}\\ \text{alkyl}}}{\overset{X}{\underset{|}{C}}}-\text{Piperazyl}$$

wherein V is a member of the group consisting of hydrogen, hydroxy, lower alkoxy, lower alkyl and halogen, W and X are members of the group consisting of hydrogen and hydroxy with the proviso that at least one of W and X is hydrogen, and when W and X are taken together they form an additional double bond between the carbon atoms to which they are attached.

4. A compound of the formula:

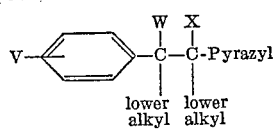

wherein V is a member of the group consisting of hydrogen, hydroxy, lower alkoxy, lower alkyl and halogen, W and X are members of the group consisting of hydrogen and hydroxy with the proviso that at least one of W and X is hydrogen, and when W and X are taken together they form an additional double bond between the carbon atoms to which they are attached.

5. A compound of the formula:

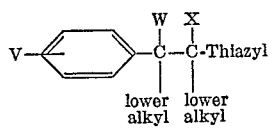

wherein V is a member of the group consisting of hydrogen, hydroxy, lower alkoxy, lower alkyl and halogen, W and X are members of the group consisting of hydrogen and hydroxy with the proviso that at least one of W and X is hydrogen, and when W and X are taken together they form an additional double bond between the carbon atoms to which they are attached.

6. A compound of the formula:

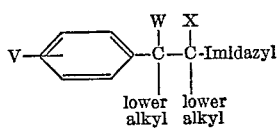

wherein V is a member of the group consisting of hydrogen, hydroxy, lower alkoxy, lower alkyl and halogen, W and X are members of the group consisting of hydrogen and hydroxy with the proviso that at least one of W and X is hydrogen, and when W and X are taken together they form an additional double bond between the carbon atoms to which they are attached.

7. Di-lower alkyl hydroxyphenethylpyrazine wherein one of the said lower alkyl groups is attached to one of the carbon atoms separating the phenyl group from the pyrazyl group and the other lower alkyl group is attached to the other carbon atom separating the phenyl from the pyrazyl group.

8. Di-lower alkyl lower alkoxyphenethylpyrazine wherein one of the said lower alkyl groups is attached to one of the carbon atoms separating the phenyl group from the pyrazyl group and the other lower alkyl group is attached to the other carbon atom separating the phenyl from the pyrazyl group.

9. A compound of the formula:

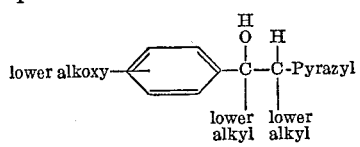

10. A compound of the formula:

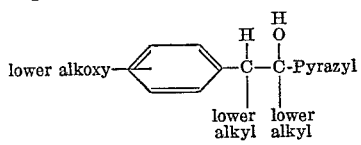

11. A compound of the formula:

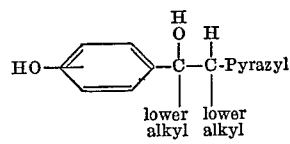

12. A compound of the formula:

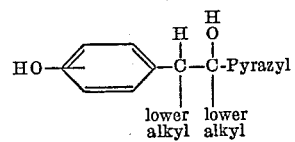

13. A compound of the formula:

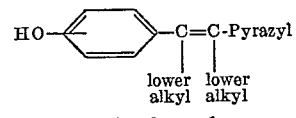

14. A compound of the formula:

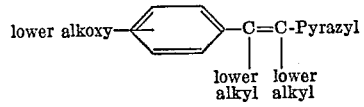

15. 3-(2-pyrazyl)-4-(p-methoxyphenyl)-3-hexene.
16. 2-(p-methoxyphenyl)-3-(2-pyrazyl)-pentane.
17. 2-(p-methoxyphenyl)-3-(2-pyrazyl)-2-pentene.
18. 2-(p-methoxyphenyl)-3-(2-pyrazyl)-2-pentanol.
19. 3-(2-pyrazyl)-4-(p-methoxyphenyl)-hexane.

No References Cited

NICHOLAS S. RIZZO, *Primary Examiner.*

U.S. Cl. X.R.

260—268, 293, 294.7, 302, 309; 424—250